United States Patent [19]
Dreksler

[11] 3,828,412
[45] Aug. 13, 1974

[54] METHOD OF FORMING HIGH INTEGRITY EPOXY JOINT BETWEEN ALUMINUM TUBES

[75] Inventor: Moshe Y. Dreksler, Harwinten, Conn.

[73] Assignee: Dunham Bush, Inc., West Hartford, Conn.

[22] Filed: Feb. 8, 1973

[21] Appl. No.: 330,545

Related U.S. Application Data

[62] Division of Ser. No. 125,988, Mar. 19, 1971.

[52] U.S. Cl............... 29/157 R, 29/458, 29/DIG. 1, 156/296, 285/332, 285/DIG. 20
[51] Int. Cl...................... B21d 41/02, F16b 11/00
[58] Field of Search........... 29/157 R, 157.3 R, 458, 29/DIG. 1; 156/294, 296; 165/178; 285/157, 332, DIG. 16, DIG. 20

[56] References Cited
UNITED STATES PATENTS

| | | | |
|---|---|---|---|
| 3,124,874 | 3/1964 | Woolley | 29/458 |
| 3,347,728 | 10/1967 | Preotle et al. | 29/458 |
| 3,498,866 | 3/1970 | Kilbane | 156/294 X |
| 3,556,567 | 1/1971 | O'Connor | 29/458 X |
| 3,785,025 | 1/1974 | Wolf | 29/458 X |

Primary Examiner—Charles W. Lanham
Assistant Examiner—D. C. Reily, III
Attorney, Agent, or Firm—Sughrue, Rothwell, Mion, Zinn and Macpeak

[57] ABSTRACT

Aluminum tubes particularly useful in forming heat exchange coils are joined together by first flaring and necking respective tube ends to define tapered mating surfaces to insure maximum wetting of both surfaces by the epoxy which bonds the tubes together when the epoxy coated male tube is inserted axially within the female tube.

3 Claims, 6 Drawing Figures

PATENTED AUG 13 1974  3,828,412
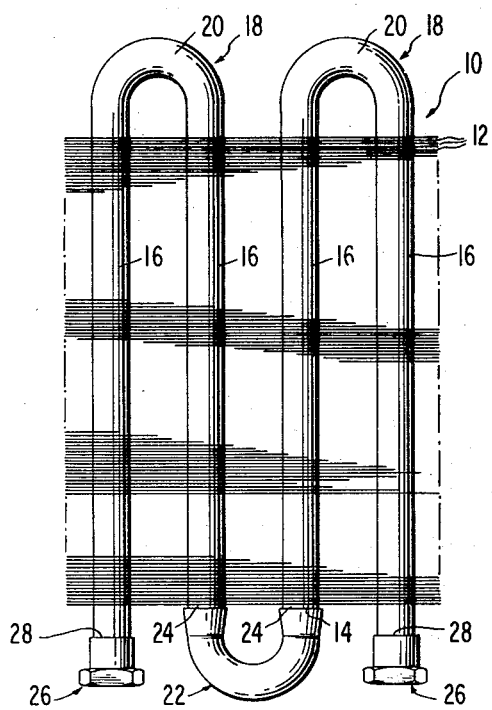
FIG.1
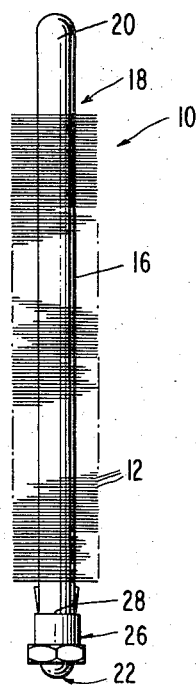
FIG.2
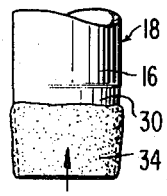
FIG.4
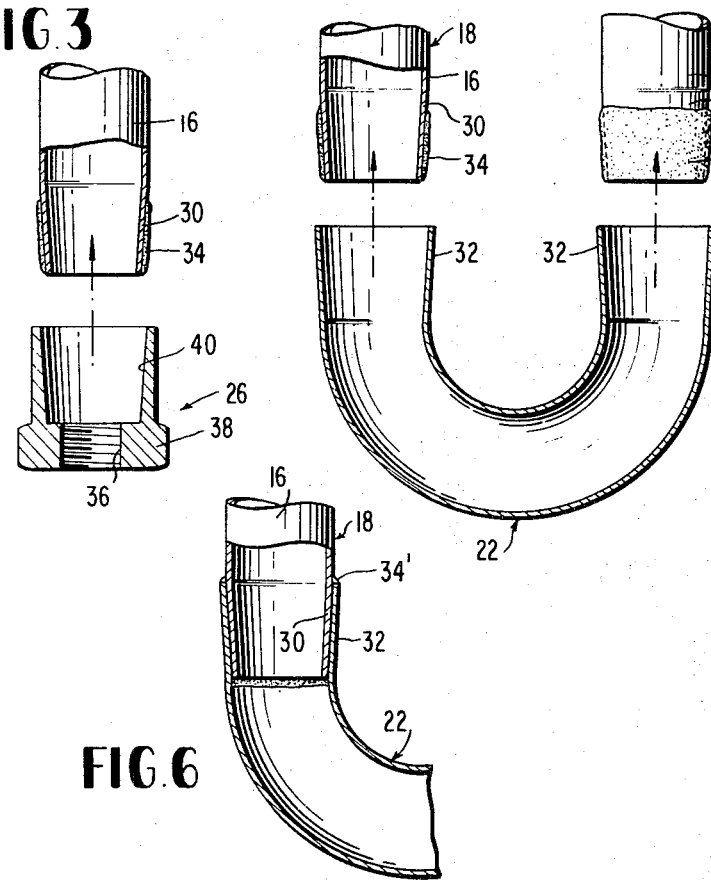
FIG.3
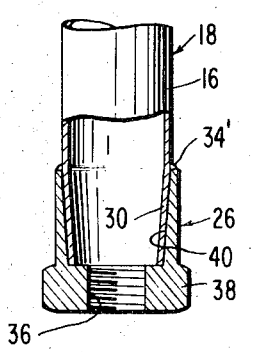
FIG.5
FIG.6

METHOD OF FORMING HIGH INTEGRITY EPOXY JOINT BETWEEN ALUMINUM TUBES

This is a division of application Ser. No. 125,988, filed Mar. 19, 1971.

BACKGROUND OF THE INVENTION

1. Field of the Invention

The present invention relates to the formation of high integrity joints between aluminum tubes and, more particularly, to the formation of a high integrity epoxy joint between tubular aluminum members particularly useful in the refrigeration field.

2. Description of the Prior Art

Heat exchange coils of the fin and tube type have been manufactured in the past by utilizing thin, extruded tubes of metals having high thermal conductivity, in which case sections of tubes, after insertion through holes within a plurality of longitudinally spaced fins, and coupled together to effect a serpentine flow path through the radiating fins and may in turn, have threaded fittings and the like coupled to the extreme ends of the serpentine coil for attachment to a liquid source and drain. In the past, heat exchanges of this type have been formed of either copper or aluminum tubes in which case the joints between tube sections or between the tubes and the end fittings were formed generally by various brazing processes. Not only is the assembly of aluminum parts and the subsequent brazing, time consuming and therefore relatively costly and complex, but the brazing operation is highly critical with low production rates due to the need for complete rinse of the brazing flux, and a relatively high percentage of leaks occurring at the brazed joints. The presence of one or more leaks requires rebrazing of the assembly in the leak area to eliminate the same. While rebrazing and soldering allows some of the units to be made leak-free, certain assemblies have to be discarded, either because of the impossibility to reach the area of the leak or to successfully eliminate the same.

SUMMARY OF THE INVENTION

The present invention is directed to a method of forming a high integrity adhesive joint between tubular aluminum members and, in particular, to an aluminum heat exchanger coil employing epoxy adhesive joints between tubular aluminum components. The method involves flaring the ends of one tubular member to define an outwardly tapering female mating surface portion and correspondingly necking the coupling end of the other tubular member to define a corresponding inwardly tapered female mating surface portion. An epoxy adhesive is supplied to at least one of the mating surface portions, and the male tubular member is axially inserted into the female member until the epoxy uniformly wets both mating surfaces, whereupon the epoxy is cured to effect the high integrity bond. Preferably, the axial insertion is completed when a small bead of epoxy is uniformly extruded completely around the periphery of the exposed edge of the flared female tubular member.

The invention is particularly applicable to a heat exchange coil of the type which includes a plurality of adjacently positioned hairpin-shaped tubes, commonly supported by a plurality of longitudinally spaced heat exchange fins, with the tubes extending through holes formed within the fins. The ends of two separate tubes are joined by a U-shaped return bend tube to effect a serpentine configuration to the aluminum tube heat exchanger. The improvement lies in flaring the ends of the hairpin-shaped tubes and necking the ends of the return bend tubes or vice versa prior to applying an epoxy adhesive bond between the coplanar mating surfaces of the tube ends to effect a high integrity seal by curing the epoxy subsequent to coupling of the return bends to the exposed ends of the hairpin-shaped tubes. The extreme tube ends of the assembly may carry threaded couplings which in turn have cooperating tapered surfaces facing the tube ends for achieving a high integrity epoxy seal therebetween.

BRIEF DESCRIPTION OF THE DRAWINGS

FIG. 1 is a plan view of a heat exchanger coil incorporating the high integrity epoxy joint between tubular aluminum members forming components of the same.

FIG. 2 is a side elevation of the embodiment of FIG. 1.

FIGS. 3 and 4 are exploded sectional views of portions of the heat exchanger coil of FIG. 1 illustrating how the epoxy joints are to be completed by the method of the present invention.

FIGS. 5 and 6 are sectional views of the coil portions of FIGS. 3 and 4, respectively, after curing the epoxy joints.

DESCRIPTION OF THE PREFERRED EMBODIMENT

The method of the present invention is exemplified in a preferred embodiment in terms of the heat exchange coil 10, FIG. 1, which comprises essentially a plurality of longitudinally spaced outer fins in the form of rectangular plates 12 of aluminum or other high thermal conductive material, the fins having circular openings 14 at laterally spaced positions which receive the straight portions 16 of, in this case, a pair of hairpin aluminum tubes 18. The straight tube portions 16 are joined by a semi-circular connecting portion 20 and the hairpin tubes 18 are joined at one end by a U-shaped return bend tube 22 and define with tubes 18, joints indicated generally at 24. The four tube single row coil assembly 12 therefore consists essentially of the two hairpin tubes 18 and the return bend tube 22. The outside straight tube portions 16 terminate at the same end of the assembly 12 as the return bend tube 22 in a pair of threaded tubular aluminum couplings 26 and the straight tube sections 16 define with couplings 26 joints 28. The aluminum tubes 18 and 22 are preferably formed of 3003 Alluminum Alloy or the equivalent, of zero temper, nominal three-quarter inch OD, .028 inch wall thickness and being formed to accommodate the return bend tube 22 of the same material and size. The joints 24 between the return bend tube 22 and the hairpin tubes 18 are in the form of a taper of wedge-like configuration, with the return bend tube 22 in this case forming the female part. The resulting overlap wedge-joint at 24 is covered with a single part epoxy high-temperature structural adhesive such as Type 2214 manufactured by Minnesota Mining and Manufacturing Company or the equivalent, after degreasing of the mating surfaces with tri-chlorol-ethylene or the like. The epoxy adhesive is paste-like and to insure a high integrity joint, the epoxy preferably being cured at 250° F. for 50 minutes minimum.

In greater detail, the end of the straight tube portions 16 of the hairpin tubes 18 terminate in neck portions 30 which taper inwardly, preferably at an angle of approximately 5° and, in turn, the return bend tube 22 is provided with flared portions 32 at each end which taper outwardly at the same angle and extend axially the same length as the neck portions 30 of the tube ends to be mated therewith. Preferably, in forming both the flared and neck ends of both tubes 18 and 22, a mechanical deformation or swaging process may be employed with respect to both mating surfaces, to create longitudinal surface indentations or, scratches constituting an axially roughened section which materially increases the wetability between the epoxy 34 which is applied to either the male tapered surface portion 30 or the female tapered portion 32 of tubes 18 and 22 respectively. Alternatively, the epoxy 34 may be applied to both surfaces after degreasing, as mentioned previously.

Coupling of the extreme of the outside tube ends to aluminum tubular couplings 26, is achieved in an identical manner. In this case, however, the couplings which consist of cast aluminum alloy, include a threaded bore 36 within a flange area 38, and the tubular fitting 26 is provided with an outwardly flared or tapered counter-bore 40 which is also at an angle of approximately five degrees to the tube axis. Thus, the tapered bore 40 acts as the female mating surface for the necked terminal ends 30 of tubes 18. Again, either mating surface 40 or surface 30 may have applied thereto either a coating of epoxy as at 34 or both surfaces may have applied coatings prior to assembly.

Reference to FIGS. 5 and 6 indicates portions of a completed assembly after curing. It is noted that during the axial insertion of the male mating surfaces 30 into the respective female surfaces 24 of the return bend tube 22 and 40 of the tubular end fittings 26, the insertion terminates when there is a full wetting of the surfaces by the epoxy which may be visually observed by the extrusion of a thin bead 34' of epoxy about the edge 42 of the return bend tube 22 and the outer edge 44 of each of the threaded fittings 26. Once assembled in this manner, curing is achieved at 250° F. for a time period in excess of fifty minutes. The completed assembly may then be tested for leaks and any joints which are found leaking are repaired in a simple manner by applying heat to the zone of the epoxy until it burns which is above approximately 600° F. for the 2214 high temperature structural epoxy adhesive. At this temperature, the aluminum tubing and the aluminum cast fittings 26 are unaffected. The return bend tube 22 and the fittings 26 are removed after the epoxy burns and the charred exposed epoxy is cleaned either mechanically or chemically. After the burned epoxy is removed, the parent metal is exposed and is cleaned, permitting assembly in the manner of FIG. 1 involving normal preparation, that is, degreasing, epoxy application, return bend and fitting assembly and curing. If necessary, a chemical remover and a separate cleaner may be used under the trade names Cee Bee and product designations A227D and 21D respectively or equivalents. Epoxy may be cleaned effectively by emersing the coil ends for approximately one hour in the A227D chemical remover.

From the above, it is readily evident in a simplified two-tube heat exchanger coil, a single hairpin tube may be employed with fittings such as fittings 26 at the free ends thereof and coupled by the epoxy jointing techniques set forth above. Further, multi-tube coils may be manufactured without the necessity of the fittings 26 with the ends of the outside tubes being connected directly to piping, hoses or the like carrying oil, liquid or gaseous refrigerant or the like.

From the above description it is readily apparent that an epoxy joint of aluminum tubes or tubular members by the improved method of the present invention has many advantages. The assembly of the invention allows positive positioning of the parts to be joined in terms of the area which is to be epoxy bonded and at the same time assures the complete wetting of the mating surfaces by the bond material without scraping off any of the epoxy due to the axial movement of the tubular members into position for joining by the epoxy bond. This is to be contrasted to conventional joining of tubes by epoxy bond or otherwise in which either the inside of the female tube or the outside of the male tube is first coated with the bonding material, then, if parallel surfaces carry the coating material during the telescoping of the male member within the female member, there is a tendency for the bonding material to be scraped from the telescoping surfaces. This not only creates voids, inclusions, or pockets devoid of bonding material, but necessitates attempting to rectify such a situation which to date have been ineffective to repair the damage. In one attempt, the application of suction to one of the tubes to cause the bonding material to be pulled in the direction of suction application, still prevents complete circumferential wetting of the mating surfaces and does not materially better the uniformity in thickness of the bonding material. In fact, it has a tendency to move the material axially rather than circumferentially and thus the voids created by axial insertion of one parallel tube surface within another are not eliminated by this approach.

To the contrary, the method of the present invention assures complete wetting of the mating surfaces by the bond material without any scraping, since axial shifting of the male member with respect to the female is terminated when a small bead of epoxy is exposed at the outer edge of the female member which is indicative of full circumferential wetting along the complete mating tapered surfaces. The reverse tapering of matched mating surfaces insures uniformity in thickness and a good bond without voids, inclusions or pockets. Further, even if there is incomplete cleaning prior to the application of the epoxy and subsequent curing, there is still an excellent chance that a completely sealed joint is formed and the manufactured part will not have to be discarded or reprocessed by burning out the epoxy, recleaning and reapplication and curing of the epoxy.

With the illustrated coil, there is in its most simple form the assembly of a single return bend tube as a fitting which in itself is simple in view of the joint configuration. The male taper of the tube and the female taper of the return bend provide a self-aligning relationship when mated to insure proper position and preventing cocking of one tube with respect to the other. The mating surfaces are presumed to provide a close gap with minor variances. Preferably, the surfaces are roughened purposely during mechanical deformation to provide the flare and the necking and thus assure maximal effectiveness of the bond.

In fact, the total mated surface area provides a lap joint which has a sheer strength in excess of the tube and where the epoxy joint is prepared and cured properly, destructive pull tests indicate that failure occurs not at the joint but at adjacent sections of the tube. The coils of the illustrated type have been employed in cooling lubricating oils circulating through the tubes at 250 psig and 250° F. without problem.

When contrasted to brazed joint copper heat exchanger in terms of the illustrated coil assembly, the economic return employing the method of the present invention is startling. The cost of an equivalent epoxy joint between aluminum tubular members may be as low as 1/10 of those involving a brazed joint between copper tubes and as low as 1/100 of the conventional comparative brazed joint between aluminum tubular members. Further, tests conducted on epoxy joint, aluminum tube heat exchangers of the type illustrated in FIGS. 1 and 2 indicate seal failure of less than 1/10 of one per cent as contrasted to initial seal failure of as high as five per cent for the equivalent copper brazed joint copper tube heat exchangers. These coils were tested at said temperature and pressure by imparting vibrations to the coil structure and keeping at the natural frequency for an hour without any apparent weakening or bond leaks.

What is claimed is:

1. A method of forming a high integrity adhesive joint between tubular aluminum members, said method comprising:
    flaring the end of one tubular member to define an outwardly tapering female mating surface portion,
    necking the coupling end of the other tubular member to define a correspondingly oppositely tapered male mating surface portion,
    applying an epoxy adhesive uniformly to at least one of said mating surface portions,
    axially inserting the male tubular member within the female member to sandwich the epoxy adhesive between oppositely tapered male and female surface portions with the epoxy adhesive uniformly wetting both mating surfaces, and
    curing said epoxy to form the high integrity joint between said members.

2. The method of forming the high integrity adhesive joint between tubular aluminum members as claimed in claim 1, wherein said male member is axially inserted within said female member until a small bead of epoxy is uniformly extruded about the complete, exposed peripheral edge of the flared female tubular member.

3. The method of claim 2, further wherein said adhesive comprises a single part epoxy high-temperature structural adhesive and said epoxy is cured at 250° F. to 350° F.

* * * * *